United States Patent [19]
Ohtomo

[11] Patent Number: 5,256,772
[45] Date of Patent: Oct. 26, 1993

[54] MONOAZO LAKE PIGMENT AND USES THEREOF

[75] Inventor: Yoshitaka Ohtomo, Tokyo, Japan

[73] Assignee: Toyo Ink Manufacturing Co., Ltd., Tokyo, Japan

[21] Appl. No.: 789,077

[22] Filed: Nov. 7, 1991

[30] Foreign Application Priority Data

Nov. 14, 1990 [JP] Japan .................................. 2-307510

[51] Int. Cl.⁵ ..................... C09B 67/22; C09B 63/00; C09D 11/02; C09D 17/00
[52] U.S. Cl. ......................................... 534/573; 8/639; 8/641; 106/22 D; 106/23 K; 106/493; 106/402; 106/494; 106/495; 534/863; 534/864; 534/865
[58] Field of Search .......... 534/863, 864, 865, 573 M; 106/493, 494, 496, 22, 23, 402, 22 D, 23 K; 8/639, 641

[56] References Cited

U.S. PATENT DOCUMENTS 2,521,908  9/1950  Glass et al. ................ 534/865 X
4,154,577  5/1979  Mieder et al. .............. 534/864 X
4,767,844  8/1988  Ando et al. ................ 534/864 X

FOREIGN PATENT DOCUMENTS 0039307  11/1981  European Pat. Off. ............ 534/863

*Primary Examiner*—Floyd D. Higel
*Attorney, Agent, or Firm*—Wenderoth, Lind & Ponack

[57] ABSTRACT

A monoazo lake pigment and use thereof; the monoazo lake pigment is obtained by subjecting to a coupling reaction a diazo component mixture containing a naphthalene-based or benzene-based amine having a soluble group and 0.1 to 20 mol %, based on said amine, of a naphthalene-based or benzene-based amine having no soluble group and a coupler component mixture containing either β-naphthol or β-oxynaphthoic acid and 0.1 to 30 mol %, based on said β-naphthol or β-oxynaphthoic acid, of at least one member selected from compounds of the following formulae (I) to (III), and carrying out a lake-forming reaction of a coupling reaction product during or after said coupling reaction,

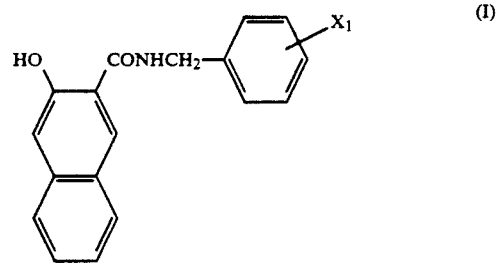

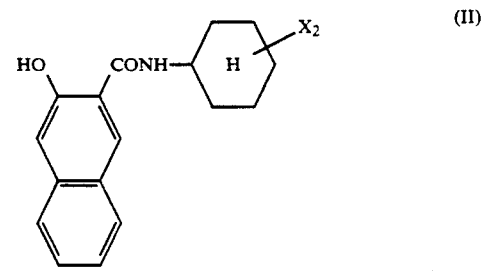

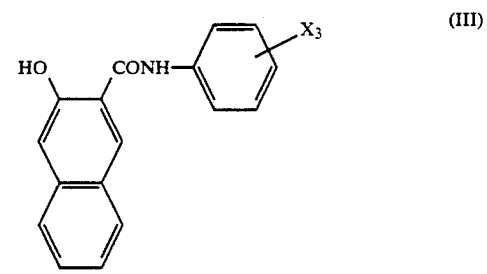

wherein each of $X_1$, $X_2$ and $X_3$ is at least one water-insoluble group selected from the group consisting of a halogen atom, a lower alkoxy group, a lower alkyl group, a nitro group and an amino group substituted with a lower alkyl group.

6 Claims, No Drawings

MONOAZO LAKE PIGMENT AND USES THEREOF

FIELD OF THE INVENTION

The present invention relates to a monoazo lake pigment and to the use thereof. More specifically, it relates to a monoazo lake pigment having excellent transparency, clearness, tinting strength, etc., as a colorant for an offset ink (lithographic ink), a gravure ink, a coating composition and a plastic material, and to the use thereof.

PRIOR ART

A monoazo lake pigment has been widely used due to its excellent solvent resistance and light resistance. A pigment is particularly required to have improved properties of transparency, clearness, tinting strength, gloss, etc., when used in a printing ink.

In order to improve a monoazo lake pigment in the above properties, it is necessary to prevent the growth of crystal grains of the pigment. For this purpose, there has been proposed a method in which the pigment is treated with rosin, or in which part of the coupler component is replaced with a 2-hydroxy-naphthoic acid derivative such as naphthol AS before the a monoazo component and the coupler component are mixed and coupled with each other (JP-A-61-203176 and U.S. Pat. No. 4,767,844).

However, the method of treating the pigment with rosin causes problems of a decrease in tinting strength and occurrence of scumming. And, the latter method of replacing part of the coupler component with a 2-hydroxy-naphthoic acid derivative before mixing and coupling the two components involves a problem in that the improvement in clearness and gloss is insufficient.

SUMMARY OF THE INVENTION

It is an object of the present invention to overcome the above problems and provide a monoazo lake pigment which is not only excellent in tinting strength, clearness and gloss, but also is stable in product quality.

According to the present invention, there is provided a monoazo lake pigment prepared by subjecting to a coupling reaction a diazo component mixture containing a naphthalene-based or benzene-based amine having a soluble group and 0.1 to 20 mol %, based on said amine, of a naphthalene-based or benzene-based amine having no soluble group and a coupler component mixture containing either β-naphthol or β-oxynaphthoic acid and 0.1 to 30 mol %, based on said β-naphthol or β-oxynaphthoic acid, of at least one member selected from compounds of the following formulae (I) to (III), and carrying out a lake-forming reaction of a coupling reaction product during or after said coupling reaction,

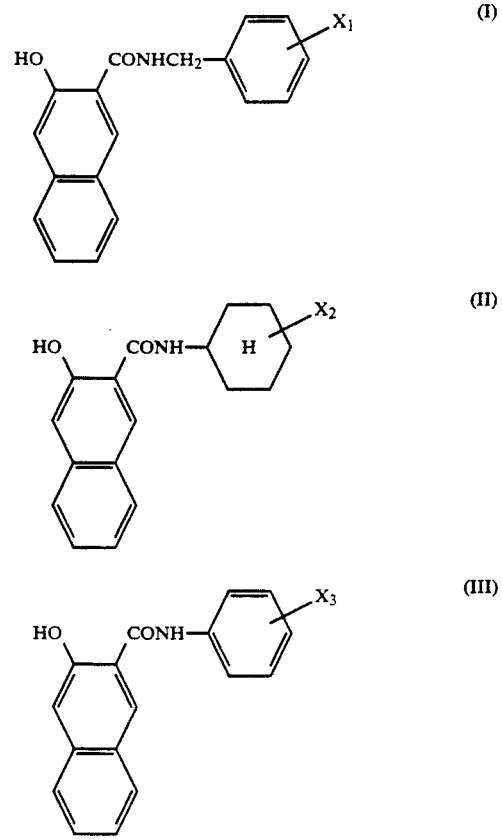

wherein each of $X_1$, $X_2$ and $X_3$ is at least one water-insoluble group selected from the group consisting of a halogen atom, a lower alkoxy group, a lower alkyl group, a nitro group and an amino group substituted with a lower alkyl group.

According to the present invention, there is further provided a printing ink composition comprising the above monoazo lake pigment and a vehicle for a printing ink.

DETAILED DESCRIPTION OF THE INVENTION

The present inventors have made diligent studies to overcome the above prior art problems, and found that when other compounds having specific structures are incorporated into the monoazo component and the diazo component, a monoazo lake pigment having excellent properties can be obtained without incorporating any other conventional additive or treating the pigment with a conventional treating agent. The present invention has been completed on the basis of this finding.

The naphthalene-based amine or benzene-based amine having a soluble group, used in the present invention, is preferably selected from compounds having an amino group and either a sulfonic acid group or a carboxylic acid group. Examples of the compounds having an amino group and a sulfonic acid group are benzenesulfonic acids such as 3-aminobenzenesulfonic acid, 4-aminobenzenesulfonic acid, 3-amino-4-chlorobenzenesulfonic acid, 2-chloro-5-aminobenzenesulfonic acid, 2,5-dichloro-4-aminobenzenesulfonic acid, 3-amino-4-hydroxybenzenesulfonic acid, 2-hydroxy-5-aminobenzenesulfonic acid, 2-hydroxy-4-aminobenzenesulfonic acid, 2-hydroxy-3-amino-5-chlorobenzenesulfonic acid, 3-methyl-4-aminobenzenesulfonic acid, 3-amino-4-methylbenzenesulfonic acid, 2-methyl-4-aminobenzenesulfonic acid, 2,4-dimethyl-5-aminobenzenesulfonic acid, 2-methyl-3-chloro-5-aminobenzenesulfonic acid, 2-methyl-4-amino-5-hydroxybenzenesulfonic acid, 3-nitro-4-aminobenzenesulfonic acid, 2-nitro-4-aminobenzenesulfonic acid, 3-amino-4-hydroxy-5-nitrobenzenesulfonic acid, 2-hydroxy-3-nitro-5-aminobenzenesulfonic acid, 3-amino-4-methoxybenzenesulfonic acid, 2-methoxy-5-aminobenzenesulfonic acid, 3-methoxy-4-aminobenzenesulfonic acid, 2-methyl-4-amino-5-methoxybenzenesulfonic acid, 2-hydroxy-3-amino-5-methoxybenzenesulfonic acid, 3-acetylamino-5-aminobenzenesulfonic acid, 3-acetylamino-5-amino-6-hydroxybenzenesulfonic acid; aminonaphthalenesulfonic acids such as 2-amino-1-naphthalenesulfonic acid, 5-amino-1-naphtalenesulfonic acid, 5-amino-2-naphtalenesulfonic acid, 8-amino-1-naphtalenesulfonic acid, 5-acetylamino-2-amino-1-naphtalenesulfonic acid, 2-amino-8-benzoylamino-1-naphtalenesulfonic acid, 6-amino-2-naphtalenesulfonic acid, etc; aminonaphthalenedisulfonic acids such as 7-amino-1,3-naphtalenedisulfonic acid, 6-amino-1,3-naphtalenedisulfonic acid, 2-amino-6,8-naphtalenedsulfonic acid, etc; 4-(4-amino-3-methoxyphenylazo)benzenesulfonic acid; 4,4'-diaminodiphenyl-2,2'-disulfonic acid; and the like.

Examples of the compounds having an amino group and a carboxylic acid group are 2-aminobenzoic acid, 3-aminobenzoic acid, 2-hydroxy-3-aminobenzoic acid, 2-hydroxy-5-aminobenzoic acid, 3-amino-4-hydroxybenzoic acid, 3-amino-4-methoxybenzoic acid, 3-amino-4-chlorobenzoic acid, 3-chloro-4-aminobenzoic acid, 2-chloro4-aminobenzoic acid, 3-amino-4-methylbenzoic acid, 2-nitro-4-aminobenzoic acid, 2-nitro-5-aminobenzoic acid, 3-amino-4-acetylaminobenzoic acid, 2-amino-1-naphthalenecarboxylic acid, 5-amino-1-naphthalenecarboxylic acid, 5-amino-1-naphtalenecarboxylic acid, 5-amino-2-naphtalenecarboxylic acid, 8-amino-1-naphtalenecarboxylic acid, 5-acetylamino-2-amino-1-naphtalenecarboxylic acid, 2-amino-8-benzoylamino-1-naphtalenecarboxylic acid, 7-amino-1,3-naphtalenedicarboxylic acid, etc.

The naphthalene-based amine or benzene-based amine having no soluble group is selected, for example, from aniline, p-toluidine, m-chloroaniline, p-chloroaniline, p-aminophenol, p-n-butylaniline, m-nitroaniline, 1-naphthylamine, 2-naphthylamine, 4-chloro-1-naphthylamine, 3-methyl-1-naphthylamine, etc.

The compounds of the formulae (I) to (III) used as part of a coupler component can be easily produced by reacting β-oxynaphthoic acid or derivatives of β-oxynaphthoic acid with corresponding amines. In the compounds of the formulae (I) to (III), specific examples of $X_1$ to $X_3$ are halogen atoms such as chlorine, bromine, etc., lower alkoxy groups such as a methoxy group, an ethoxy group, etc., lower alkyl groups such as a methyl group, an ethyl group, a nitro group, and an amino group at least one hydrogen atom of which is replaced with a lower alkyl group such as a methyl group, an ethyl group, a butyl group, or the like.

Specific examples of the compounds of the formulae (I) to (III) are as follows.

2-hydroxy-3-naphtho-5'-chloro-2',4'-dimethoxyanilide, 2-hydroxynaphthalene-3-carbonylanilide, 2-hydroxynaphthalene-3-carbonyl-4'-chloroanilide, 2-hydroxy-3-cyclohexylnaphthoamide, 2-hydroxy-3-[N-(1-benzyl)]-5'-chloro-2',4'-dimethoxynaphthoamide, 2-hydroxy-3-cyclohexyl-5'-chloro-2',4'-dimethoxynaphthoamide, 2-hydroxy-3-naphtho-2'-methylanilide, etc. Of these, preferred are 2-hydroxy-3-[N-(1-benzyl)]naphthoamide, 2-hydroxy-3-cyclohexylnaphthoamide, 2-hydroxynaphthalene-3-carbonylanilide and 2-hydroxynaphthalene-3-carbonyl-4'-chloroanilide.

The monoazo lake pigment of the present invention has excellent suitability to printing inks over conventional monoazo lake pigments. When conventional monoazo lake pigments are used in printing inks, it is required to add various additives to such monoazo lake pigments or treat such monoazo lake pigments with various treating agents. As a result, there have been caused many problems such as a decrease in transparency, clearness, etc. Since, however, the monoazo lake of the present invention does not require any such additives, etc., it is free from problems caused by such additives, etc.

The monoazo lake pigment of the present invention can be produced according to a process for the production of conventional monoazo lake pigments. For example, a mixture containing a naphthalene-based or benzene-based amine having a sulfonic acid group or carboxylic acid group and 0.1 to 20 mol %, based on the amine, of a naphthalene-based or benzene-based amine having no soluble group is diazotized at a temperature between −10° C. and 10° C. according to a conventional method, whereby a diazo component is prepared.

A mixture containing of either β-naphthol or β-oxynaphthoic acid and 0.1 to 30 mol %, based on the β-naphthol or β-oxynaphthoic acid, of at least member of the compounds of the formulae (I) to (III) is dissolved in a sodium hydroxide aqueous solution, whereby a coupler component is prepared. The above diazo component is added dropwise to the coupler component to start a coupling reaction. The coupling reaction is carried out under conventional conditions, i.e., at a temperature between −50° C. and 50° C., preferably between −10° C. and 20° C. The formation of a lake pigment may be carried out in the presence of a lake-forming agent during or after the coupling reaction. When the formation of a lake pigment is completed, the monoazo lake pigment intended in the present invention can be obtained.

The lake-forming agent is selected from salts of alkaline earth metals and salts of manganese, etc. Examples of the salts of the alkaline earth metals are mineral acids or organic acid salts of calcium, strontium, barium, etc., such as sulfates, nitrates, hydrochlorides, phosphates, etc. Examples of manganese, etc., are also mineral acids or organic acids of manganese, etc., as described above.

The monoazo lake pigment obtained above may be treated with an additive or treating agent such as aliphatic amines, water-soluble resins, surfactants, etc.

After the above lake-forming reaction, the slurry of the monoazo lake pigment is filtered, and the resultant pigment particles are washed with water. Thereafter, the pigment particles may be aged at a temperature between 60° C. and 95° C. for approximately 10 minutes to 3 hours. This aging contributes to improvement of the pigment in dispersibility and transparency maintenance.

The resultant wet cake of the pigment may be formed into a base color after a flushing step in which the wet cake is directly mixed with a varnish for an ink or a resin for a coating composition. The wet cake may be dried and milled to a proper size to form a pigment powder.

Formulation examples of printing ink composition containing the monoazo lake pigment of the present invention are as follows.

A gravure ink comprises 3 to 40% by weight of the monoazo lake pigment of the present invention, 97 to 60% by weight of a vehicle for a gravure ink, and 0 to 20% by weight of other aids and an extending pigment. The vehicle for a gravure ink contains 50% by weight of a resin mixture and 30 to 80% by weight of a solvent. The components for the resin mixture are selected from gum rosin and lime rosin, a maleic acid resin, a polyamide resin, a vinyl resin, nitrocellulose, an ethylene-vinyl acetate copolymer resin, a polyurethane resin, a polyester resin, an alkyd resin, gilsonite, dammar and shellac. The solvent is selected from hydrocarbons, alcohols, ketones, ether alcohols, ethers and esters.

An offset ink comprises 3 to 40% by weight of the monoazo lake pigment of the present invention, 97 to 45% by weight of a vehicle for an offset ink and 0 to 20% by weight of other aids and an extending pigment. The vehicle for an offset ink contains 20 to 50% by weight of a resin, 0 to 30% by weight of a plant oil and 10 to 60% by weight of a solvent. The resin is selected from a rosin-modified phenol resin, a petroleum resin, an alkyd resin and products obtained by modifying these oils with a drying oil. The plant oil is selected from linseed oil, tung oil and soybean oil. The solvent is selected from n-paraffin, isopraraffin, aromatics, naphthene and α-olefins.

According to the present invention, there is provided a monoazo lake pigment which is excellent in transparency, clearness and tinting strength over conventional monoazo lake pigments.

According to the present invention, there is also provided a monoazo lake pigment having excellent fluidity.

According to the present invention, there is further provided a monoazo lake pigment having excellent printability. In contrast, conventional monoazo lake pigments inevitably show a degradation in printability, since they are obtained by treatment with rosin or some other treatments.

Further, according to the present invention, there is provided a monoazo lake pigment having excellent thermal stability at a flushing operation time. That is, in conventional monoazo lake pigments, the pigment particles show crystal growth, aggregation, etc., when heated at a flushing operation time. As a result, inks containing such pigments inevitably show an extraordinary decrease transparency and tinting strength. In contrast, the monoazo lake pigment according to the present invention does not cause such degradation in product quality and has thermal stability.

The present invention will be detailed hereinafter by reference to Examples, in which "part" stands for "part by weight" and "%" stands for "% by weight" unless otherwise specified.

EXAMPLE 1

18.9 Parts of 2-amino-5-methylbenzenesulfonic acid was added to an aqueous solution consisting of 4 parts of sodium hydroxide and 400 parts of water. Then, after 25 parts of 35% hydrochloric acid was added for acidolysis, 0.16 part of aniline was added, and further, 58 parts of 35% calcium chloride was added. Thereafter, while temperature of the mixture was kept at 5° C. or lower by adding 300 parts of ice, 7 parts of sodium nitrite was added to obtain a diazo component.

18.7 Parts of β-oxynaphthoic acid and 1 part of 2-hydroxy-3-[N-(1-benzyl)]naphthoamide were dispersed in 700 parts of water, and 10.6 parts of sodium hydroxide was dissolved in the dispersion. Then, 42.4 parts of 10% rosin soap was added to the dispersion to obtain a coupler component. The coupler component was added dropwise to the above diazo component while the temperature of the resulting mixture adjusted to and kept at 22° to 24° C. After the addition, the resultant mixture solution was stirred for 60 minutes to complete the lake forming reaction. Thereafter, temperature of the reaction mixture was increased to 70° C., and at this temperature, the reaction mixture was further stirred for 60 minutes, and then filtered while it was hot. The remaining solid was washed with water, and dried at 90° C. to give 50 parts of a bluish red powder.

EXAMPLE 2

18.9 Parts of 2-amino-5-methylbenzenesulfonic acid was dissolved in an aqueous solution consisting of 4 parts of sodium hydroxide and 400 parts of water. Then, after 25 parts of 35% hydrochloric acid was added for acidolysis, 0.18 part of p-toluidine was added, and while the temperature of the mixture was maintained at 5° C. or lower by adding ice, 7 parts of sodium nitrite was added to obtain a diazo component.

18.7 Parts of β-oxynaphthoic acid and 1.0 part of 2-hydroxy-3-cyclohexylnaphthoamide were dispersed in 700 parts of water, and then, 10.6 parts of sodium hydroxide was dissolved in the dispersion. And, 42.4 parts of rosin soap was added to the dispersion to obtain a coupler component. The above diazo component was added dropwise to the coupler component while the temperature of the resulting solution was adjusted to 22° to 23° C. After the coupling reaction, 58 parts of 35% calcium chloride was added, and the resultant mixture was stirred for 60 minutes to complete the lake forming reaction. thereafter, the temperature of the reaction mixture was increased to 70° C., and at this temperature, the reaction mixture was further stirred for 60 minutes, and then filtered. The remaining solid was washed with water and dried at 90° C. to give 50 parts of a bluish red powder.

EXAMPLE 3

Example 1 was repeated except that 0.16 part of aniline was replaced with 0.22 part of m-chloroaniline and that 1 part of 2-hydroxy-3-[N-(1-benzyl)]naphthoamide was replaced with 1 part of 2-hydroxynaphthalene-3-carbonylanilide, whereby 50 parts of bluish red powder was obtained.

EXAMPLE 4

Example 2 was repeated except that 0.18 part of p-toluidine was replaced with 0.25 part of 2-aminonaphthalene and that 1.0 part of 2-hydroxy-3-cyclohexylnaphthoamide was replaced with 1.2 parts of 2-hydroxynaphthalene-3-carbonyl-4'-chloroanilide, whereby 50 parts of a bluish red powder was obtained.

COMPARATIVE EXAMPLE 1

Example 1 was repeated except for the following: The amount of 2-amino-5-methylbenzenesulfonic acid was changed from 18.9 parts to 19.3 parts, no aniline was used, the amount of β-oxynaphthoic acid was changed from 18.7 parts to 19.6 parts, and no 2- hydroxy-3-[N-(1-benzyl)]naphthoamide was used. As a result, 50 parts of a bluish red powder was obtained.

COMPARATIVE EXAMPLE 2

Example 1 was repeated except that the amount of 2-amino-5-methylbenzenesulfonic acid was changed from 18.9 parts from 19.3 parts and that no aniline was used, whereby 50 parts of a bluish red powder was obtained.

COMPARATIVE EXAMPLE 3

Example 1 was repeated except for the following: The amount of 2-amino-5-methylbenzenesulfonic acid was changed from 18.9 parts to 19.3 parts, no aniline was used, and 1 part of 2-hydroxy-3-[N-1-(benzyl)-]naphthoamide was replaced with 1.0 part of 2-hydroxy-3-cyclohexylnaphthoamide. As a result, 50 parts of a bluish red powder was obtained.

COMPARATIVE EXAMPLE 4

Example 1 was repeated except for the following: The amount of 2-amino-5-methylbenzenesulfonic acid was changed from 18.9 parts to 19.3 parts, no aniline was used, 1 part of 2-hydroxy-3-[N-(1-benzyl)]naphthoamide was replaced with 1.1 parts of 2-hydroxynaphthalene-3-carbonylanilide. As a result, 50 parts of a bluish red powder was obtained.

EXAMPLE 5

Each of the powders (pigments) obtained in Examples 1 to 4 and Comparative Examples 1 to 4 was milled and tested on printability in the following manner. Table 1 shows the results.

1. Preparation of Base Ink

| | |
|---|---|
| Lime rosin | 84 parts |
| Toluene | 46 parts |
| Pigment | 25 parts |

155 Grams of a blend consisting of the above components was charged into a 225 ml glass bottle together with 180 g of steel balls having a diameter of 3 mm, and dispersed with a paint conditioner (to be abbreviated as "PC" hereinafter) for 40 minutes.

2. Preparation of Deep-Color Ink

| | |
|---|---|
| Base ink | 54.5 parts |
| Lime rosin | 39 parts |
| Toluene | 10 parts |

85 Grams of a blend consisting of the above components was charged into a 140 ml glass bottle, and the components were mixed by means of PC for 5 minutes. Then, the blend was adjusted to a viscosity of 15 seconds through a Shell cup #2 by adjusting the toluene amount.

3. Preparation of Light-Color Ink

| | |
|---|---|
| Base ink | 3.1 parts |
| White ink | 30 parts |

33 Grams of a blend of the above components was charged into a 70 ml glass bottle, and the components were mixed by means of PC for 5 minutes.

4. Application of Inks and Measurements of Ink Properties (1) The deep-color ink was applied to a transparency testing paper sheet with a #3 bar coater, and measured for an L value (transparency) with a color machine (Σ80, supplied by Nippon Denshoku Kogyo). In Table 1, a greater L value shows poorer transparency. Further, the deep-color ink was also applied to a coat paper, and measured for gloss at 60 degrees with a digital deflection angle glossmeter (model UGV-5D, supplied by Suga Testing Machine K.K.).

(2) The light-color ink was applied to a coat paper with a #6 bar coater, and measured for tinting strength as follows. The light-color ink applied to a coat paper was measured for an L value with a color machine (Σ80, supplied by Nippon Denshoku Kogyo), and the tinting strength was expressed as a relative value when the L value of the light-color ink of Comparative Example 1 was taken as 100.

(3) The base ink was measured for viscosity at 6 rpm and 60 rpm with a Brookfield viscometer.

TABLE 1

| | Viscosity (CPS) | gloss (60°, %) | Transparency (L value) | Tinting strength (%) |
|---|---|---|---|---|
| CEx. 1 | 440/220 | 36.4 | 46.4 | 100 |
| CEx. 2 | 50/50 | 40.7 | 46.3 | 103 |
| CEx. 3 | 200/150 | 33.8 | 47.0 | 100 |
| CEx. 4 | 400/200 | 36.3 | 36.4 | 102 |
| Ex. 1 | 20/20 | 49.5 | 45.7 | 105 |
| Ex. 2 | 25/25 | 48.2 | 45.9 | 107 |
| Ex. 3 | 20/20 | 48.5 | 45.3 | 103 |
| Ex. 4 | 30/30 | 46.4 | 45.9 | 103 |

Notes:
CEx. = Comparative Example,
Ex. = Example
Viscosity = 6 rpm/60 rpm
Gloss: at 60°

EXAMPLE 6

22.1 Parts of 2-chloro-5-aminotoluene-4-sulfonic acid and 0.16 part of aniline were diaztotized according to a conventional method to obtain a diazo component. 400 Parts of a sodium hydroxide aqueous solution (sodium hydroxide:water=1:100) was dissolved in a mixture of 14.0 parts of β-naphthol with 1.1 parts of 2-hydroxy-3-[N-(1-benzyl)]naphthoamide, and 42.4 parts of 10% rosin soap was added to the mixture to obtain a coupler component. The above diazo component was added dropwise to the coupler component to give a sodium dye.

The temperature of the above sodium dye was increased to 95° C., and while this temperature was maintained, a barium chloride solution (in an amount of 1.2 mol per mol of the dye) was added to the sodium dye to form a lake. Then, the resultant lake pigment was separated by filtration, washed with water, dried and milled to give 47.2 parts of a yellowish red pigment.

An offset ink was prepared from the above pigment and a rosin-modified phenolic resin. The resultant offset ink had remarkably superior transparency, clearness and tinting strength to conventional inks containing pigments which did not contain aniline and 2-hydroxy-3-[N-(1-benzyl)]naphthoamide.

EXAMPLE 7

Example 6 was repeated except that 0.16 part of aniline was replaced with 0.2 part of p-aminophenol and that 1.1 parts of 2-hydroxy-3-[N-(1-benzyl)]naphthoamide was replaced with 1.2 parts of 2-hydroxynaphthalene-3-carbonylanilide, whereby 47.2 parts of a yellowish red pigment was obtained.

An offset ink was prepared from the above pigment in the same manner as in Example 6. The resultant offset ink was as superior in transparency, clearness and tinting strength as that obtained in Example 6.

What is claimed is:

1. A monoazo lake pigment prepared by a process which comprises (a) diazotizing a mixture of
      (1) an aminonaphthalene- or aminobenzene-sulfonic acid or carboxylic acid, and
      (2) 0.1 to 20 mol % based upon component (1) of a naphthalene amine or benzene amine containing no soluble group
   to form a diazo component, (b) reacting the diazo component in a coupling reaction with a coupler component containing
      (1) β-naphthol or β-oxynaphthoic acid, and
      (2) 0.1 to 30 mol % based upon component (1) of at least one member selected from the group consisting of compounds of the following formulae (I) to (III):

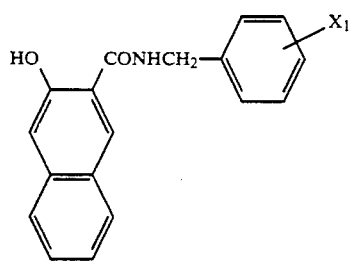

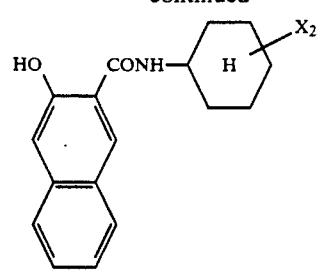

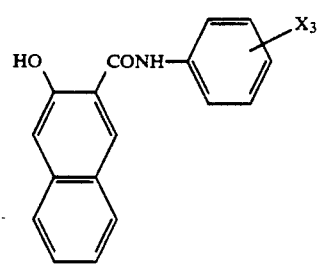

wherein each of $X_1$, $X_2$ and $X_3$ is at least one water-insoluble group selected from the group consisting of a halogen atom, lower alkoxy, lower alkyl, nitro and amino substituted with lower alkyl, and (c) subjecting the coupling reaction product to a lake-forming reaction, said lake-forming reaction being conducted during or after completion of said coupling reaction.

2. A monoazo lake pigment according to claim 1, wherein the diazo component mixture contains 0.5 to 5 mol %, based on component (1), of the naphthalene amine or benzene amine containing no soluble group.

3. A monoazo lake pigment according to claim 1, wherein the coupler component mixture contains 1 to 10 mol %, based on said β-naphthol or β-oxynaphthoic acid, of at least one member selected from the group consisting of compounds of formulae (I) to (III).

4. A printing ink composition which comprises the monoazo lake pigment recited in claim 1 and a vehicle for a printing ink.

5. A coating composition which comprises the monoazo lake pigment recited in claim 1 and a vehicle therefor.

6. A plastic composition having incorporated therein the monoazo lake pigment recited in claim 1.

* * * * *